United States Patent Office 3,144,431
Patented Aug. 11, 1964

3,144,431
OXYMETHYLENE POLYMERS STABILIZED
WITH CARBAMATES
Thomas J. Dolce, Summit, Frank M. Berardinelli, South
Orange, and Donald E. Hudgin, Summit, N.J., assignors
to Celanese Corporation of America, New York, N.Y.,
a corporation of Delaware
No Drawing. Filed Aug. 5, 1959, Ser. No. 831,720
14 Claims. (Cl. 260—45.85)

This invention relates to polymers which are structurally related to polyoxymethylene and particularly to polymers of high thermal stability. This invention also relates to a method for improving the thermal stability of polymers.

Polyoxymethylene polymers, having recurring

—CH₂O— units have been known for many years. They may be prepared by the polymerization of anhydrous formaldehyde or by the polymerization of trioxane which is a cyclic trimer of formaldehyde. Polyoxymethylene varies in thermal stability and in molecular weight, depending on its method of preparation.

High molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in Patent No. 2,989,506, by Hudgin and Berardinelli.

Although polyoxymethylenes prepared by some methods are much more stable against thermal degradation than those prepared by other methods, it is nevertheless desirable for many uses that the thermal stability be increased.

In accordance with the present invention the heat stability of oxymethylene polymers is enhanced by the incorporation therein of a urethane, also known as a carbamate.

The urethanes (carbamates) which may be used include alkyl urethanes (alkyl carbamates) such as ethyl urethane (ethyl carbamate) and dodecyl urethane (dodecyl carbamate); alkylene and oxa alkylene diurethanes (dicarbamates) such as the bis(phenylurethanes) [bis(phenylcarbamates)] of ethylene glycol and diethylene glycol, polymeric urethanes (which may also be referred to as polymeric carbamates) made by the reaction of diisocyanates with a glycol, a polyester or a polyether, such as the reaction product of toluene diisocyanate with the linear polyester of ethylene glycol and adipic acid.

In accordance with a preferred aspect of this invention, the aforesaid urethane is incorporated into a copolymer containing oxymethylene groups and oxyalkylene groups having adjacent carbon atoms, and particularly copolymers containing from 60 to 99.6 mol percent of recurring oxymethylene groups. It appears that the susceptibility of oxymethylene polymers to thermal stabilization by the addition of the aforementioned urethanes is enhanced by incorporating into the polymer oxyalkylene units having adjacent carbon atoms and derived from cyclic ethers having adjacent carbon atoms.

Among the copolymers which are utilized in accordance with this aspect of the invention are those having a structure comprising recurring units having the formula

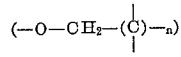

wherein $n$ is an integer from zero to 5 and wherein $n$ is zero in from 60 to 99.6 percent of the recurring units.

A preferred class of copolymers are those having a structure comprising recurring units having the formula (—O—CH₂—(CH₂O)ₙ—) wherein $n$ is an integer from zero to 2 and wherein $n$ is zero in from 60 to 99.6 percent of the recurring units. These copolymers are prepared by copolymerizing trioxane with a cyclic ether having the structure

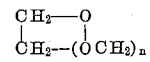

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom.

The coordinate complexes of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

In preparing the copolymers, the trioxane, cyclic ether and catalyst are dissolved in a common anhydrous solvent, such as cyclohexane, and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

It has been found that the relatively minor amounts of cyclic ether other than trioxane used in the copolymerization reaction generally disappear completely from the reaction mixture. The required ratio of trioxane to cyclic ether in the reaction mixture may therefore be roughly predetermined for a desired mol ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and an oxyethylene group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total moles of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Patent No. 2,989,-509 by Donald E. Hudgin and Frank M. Berardinelli.

In a preferred embodiment of this invention the polymer composition also contains a phenolic material, and preferably an alkylene bisphenol, as a thermal stabilizer. It appears that the stabilization action of the urethanes and of the alkylene bisphenols enhance each other so that a mixture of a stabilizer of each class is more effective than a comparable amount of stabilizer of either class, by itself.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, p-phenylphenol and octylphenol.

The urethane is generally admixed with the oxymethylene polymer in amounts not exceeding 10%, based on the weight of the oxymethylene polymer, and preferably in amounts between about 0.1 and 5 weight percent. The alkylene bisphenol, when used, is admixed in amounts not exceeding 2 weight percent and preferably from about 0.1 to about 1 weight percent.

The urethanes, particularly the non-polymeric urethanes, and the alkylene bisphenols, if desired, may be admixed intimately with the oxymethylene polymer by being applied in solution in a suitable solvent to the finely divided solid oxymethylene polymer followed by evaporation of the solvent. Methanol, acetone and chloroform are typical solvents for the non-polymeric urethanes.

The admixture may also be made by dry blending the finely divided oxymethylene polymer and finely divided stabilizers, by milling the stabilizers into the polymer as the latter is worked on a rubber mill or by dissolving the oxymethylene polymers and the stabilizers in a common solvent, such as dimethyl formamide, and evaporating the solvent.

The compositions of this invention may also include, if desired, plasticizers, fillers, pigments and stabilizers against degradation by ultra violet light.

Example I

A copolymer comprising 97.5 weight percent of monomeric units derived from trioxane and 2.5 weight percent of monomeric units derived from dioxolane was prepared by reacting 1960 parts trioxane, 49 parts dioxolane, 0.6 part $BF_3$ dibutyl etherate in 840 parts cyclohexane at 47 to 64° C. for 1 hour, 19 minutes. The reaction mixture was discharged into 2400 parts acetone containing 5 parts of tributylamine, and the polymer was filtered off and washed with acetone. 1375 parts of polymer were recovered. The polymer had an I.V. of 1.64 (measured in 0.1% weight solution in p-chlorophenol containing 2 weight percent of α-pinene).

Forty parts by weight of the above described polymer, 0.8 part of weight of 2,2'-methylene-bis-(4-methyl-6-tertiary butyl phenol) and 2 parts by weight of Multrathane U 50 (a polyurethane, or polymeric carbamate, of the following carbamate structure

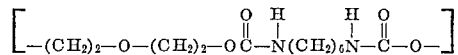

prepared by Mobay Chemical Co. having a melting point of 150 to 160° C.) were milled together at 200° to 202° C. for one hour. The milled polymer had a degradation rate at 222° C. (in an open vessel in a circulating air oven) of 0.06 weight percent/min. Prior to stabilization the polymer had a degradation rate at 222° C. of 5.8 weight percent/min.

When the above-described milling process was repeated, omitting the polyurethane and using 0.8 part by weight of the bisphenol, the degradation rate at 222° C. was 0.26 weight percent/min.

Example II

Three grams of a copolymer similar to that described above were slurried with a solution of 0.06 g. of the bis(phenyl-urethane) [bis(phenylcarbamate)] of diethylene glycol in 15 ml. of methanol. The solvent was allowed to evaporate with occasional stirring and then the polymer was dried at 65 to 70° C. for 2 hours. A tough disc was compression molded from the dried polymer for four minutes at 190° C. and 15 p.s.i.g. The degradation rate of the disc at 222° C. was 1.2 weight percent/min. The unstabilized polymer had a degradation rate of 1.7 weight percent/min.

Example III

Three grams of a copolymer similar to that described above was treated as in Example II except that the slurry contained 0.03 gram of dodecyl urethane (dodecyl carbamate) and 0.03 gram of 2,2'-methylene bis-(4-methyl-6-tertiary butyl phenol). The degradation rate of the treated polymer was 0.26 weight percent/min. for the first 4% of the polymer and 0.09 weight percent/min. for the remainder. The degradation rate of the untreated polymer was 2.3 weight percent/min.

It is to be understood that the foregoing detailed description is given merely by way of illustration and that many variations may be made therein without departing from the spirit of our invention.

Having described our invention what we desire to secure by Letters Patent is:

1. A polymer composition comprising a moldable oxymethylene polymer of high molecular weight and a stabilizing proportion of a carbamate selected from the group consisting of alkyl carbamates, alkylene and oxyalkylene dicarbamates, and polymeric carbamates.

2. A polymer composition comprising an oxymethylene polymer and a stabilizing proportion of a carbamate, said oxymethylene polymer containing oxyalkylene groups having more than one carbon atom and containing from 60 to 99.6 mol percent of oxymethylene groups, said carbamate being selected from the group consisting of alkyl carbamates, alkylene and oxyalkylene dicarbamates, and polymeric carbamates.

3. A polymer composition comprising an oxymethylene polymer and a stabilizing proportion of a carbamate, said oxymethylene polymer containing oxyethylene groups and containing from 60 to 99.6 mol percent of oxymethylene groups, said carbamate being selected from the group consisting of alkyl carbamates, alkylene and oxyalkylene dicarbamates, and polymeric carbamates.

4. A polymer composition comprising a moldable oxymethylene polymer of high molecular weight and stabilizing proportions of a carbamate and a phenolic stabilizer, said carbamate being selected from the group consisting of alkyl carbamates, alkylene and oxyalkylene dicarbamates, and polymeric carbamates.

5. A polymer composition comprising a moldable oxymethylene polymer of high molecular weight and stabilizing proportions of a carbamate and an alkylene bisphenol, said carbamate being selected from the group consisting of alkyl carbamates, alkylene and oxyalkylene dicarbamates, and polymeric carbamates.

6. A polymer composition comprising an oxymethylene polymer and stabilizing proportions of a carbamate and an alkylene bisphenol, said oxymethylene polymer containing oxyethylene groups and containing from 60 to 99.6 mol percent of oxymethylene groups wherein said alkylene bisphenol has from 1 to 4 carbon atoms in the alkylene group from 0 to 2 alkyl constituents of from 1 to 4 carbon atoms on each benzene ring and said carbamate is selected from the group consisting of alkyl carbamates, alkylene and oxyalkylene dicarbamates, and polymeric carbamates.

7. The polymer composition of claim 6 wherein said alkylene bisphenol is present in amounts between about 0.1% and 2% and said carbamate is present in amounts between about 0.1% and 10%, based on the weight of oxymethylene polymer.

8. The polymer composition of claim 7 wherein said carbamate is an alkyl carbamate.

9. The polymer composition of claim 8 wherein said carbamate is dodecyl carbamate.

10. The polymer composition of claim 7 wherein said carbamate is an alkylene dicarbamate.

11. The polymer composition of claim 10 wherein said carbamate is the bis(phenylcarbamate) of ethylene glycol.

12. The polymer composition of claim 7 wherein said carbamate is a polymeric carbamate.

13. The polymer composition of claim 7 wherein said alkylene bisphenol is 2,2'-methylene-bis(4-methyl-6-tertiary butyl phenol).

14. The polymer composition of claim 7 wherein said alkylene bisphenol is 4,4'-butylidene-bis(6-tertiary butyl-3-methyl phenol).

References Cited in the file of this patent

UNITED STATES PATENTS

| | | |
|---|---|---|
| 2,296,249 | Austin et al. | Sept. 22, 1942 |
| 2,514,550 | McFarlane et al. | July 11, 1950 |
| 2,966,476 | Kralovec et al. | Dec. 27, 1960 |

FOREIGN PATENTS

| | | |
|---|---|---|
| 748,856 | Great Britain | May 9, 1956 |
| 839,864 | Germany | May 26, 1952 |